(12) United States Patent
Takeda et al.

(10) Patent No.: US 10,950,860 B2
(45) Date of Patent: Mar. 16, 2021

(54) GRAPHITE MATERIAL FOR NEGATIVE ELECTRODE OF LITHIUM ION SECONDARY CELL AND METHOD FOR PRODUCING THE SAME

(71) Applicant: TOYOTA JIDOSHA KABUSHIKI KAISHA, Toyota (JP)

(72) Inventors: Kazuhisa Takeda, Toyota (JP); Hideaki Oka, Nagakute (JP); Norihiko Setoyama, Nagakute (JP); Yasuhito Kondo, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 106 days.

(21) Appl. No.: 16/122,607

(22) Filed: Sep. 5, 2018

(65) Prior Publication Data

US 2019/0081325 A1    Mar. 14, 2019

(30) Foreign Application Priority Data

Sep. 14, 2017    (JP) .............................. JP2017-176602

(51) Int. Cl.
*H01M 4/04*    (2006.01)
*H01M 4/133*    (2010.01)
(Continued)

(52) U.S. Cl.
CPC .......... *H01M 4/583* (2013.01); *C01B 32/184* (2017.08); *C01B 32/21* (2017.08); *H01M 2/16* (2013.01); *H01M 2/30* (2013.01); *H01M 4/0471* (2013.01); *H01M 4/133* (2013.01); *H01M 4/1393* (2013.01); *H01M 4/366* (2013.01);
(Continued)

(58) Field of Classification Search
CPC ........ H01M 2/16; H01M 2/30; H01M 4/0471; H01M 4/133; H01M 4/1393; H01M 4/366; H01M 4/583; H01M 4/587; H01M 4/62; H01M 4/621; H01M 2004/027;
(Continued)

(56) References Cited

U.S. PATENT DOCUMENTS

| 5,753,387 A | 5/1998 | Takami et al. |
| 6,632,569 B1 | 10/2003 | Kameda et al. |

(Continued)

FOREIGN PATENT DOCUMENTS

| JP | H09-213335 A | 8/1997 |
| JP | H11-111342 A | 4/1999 |

(Continued)

OTHER PUBLICATIONS

Shim, Jae-Hyun et al., "Characterization of Graphite Etched With Potassium Hydroxide and Its Application in Fast-Rechargeable Lithium Ion Batteries", Journal of Power Sources, vol. 325, (2016), pp. 475-483.

(Continued)

*Primary Examiner* — Brittany L Raymond
(74) *Attorney, Agent, or Firm* — Oliff PLC

(57) ABSTRACT

A graphite material for a negative electrode of a lithium ion secondary cell disclosed herein is substantially configured of a graphite particle in which defects enabling intercalation/deintercalation of lithium ions have been formed on a basal plane and which includes a calcium (Ca) component.

8 Claims, 5 Drawing Sheets

(51) Int. Cl.
  *H01M 4/1393* (2010.01)
  *H01M 4/36* (2006.01)
  *H01M 4/583* (2010.01)
  *H01M 4/587* (2010.01)
  *H01M 4/62* (2006.01)
  *H01M 10/0525* (2010.01)
  *C01B 32/184* (2017.01)
  *H01M 2/16* (2006.01)
  *H01M 2/30* (2006.01)
  *C01B 32/21* (2017.01)
  *H01M 4/02* (2006.01)

(52) U.S. Cl.
  CPC ............ *H01M 4/587* (2013.01); *H01M 4/62* (2013.01); *H01M 4/621* (2013.01); *H01M 10/0525* (2013.01); *H01M 2004/027* (2013.01); *H01M 2004/028* (2013.01)

(58) Field of Classification Search
  CPC ........ H01M 2004/028; H01M 10/0525; C01B 32/184; C01B 32/21
  See application file for complete search history.

(56) References Cited

U.S. PATENT DOCUMENTS 6,759,169 B1 7/2004 Ohzeki et al.
2004/0053050 A1* 3/2004 Guerfi ................. H01M 4/1393
                                                                     428/403
2009/0011333 A1  1/2009 Wakita et al.
2012/0052393 A1  3/2012 Kameda et al.
2017/0133680 A1  5/2017 Cheng et al.
2018/0019472 A1* 1/2018 Ikado ................... H01M 4/587
2018/0145327 A1* 5/2018 Zhang .................. H01M 4/587

FOREIGN PATENT DOCUMENTS

| JP | 2000-340232 A | 12/2000 | |
| JP | 2009-016245 A | 1/2009 | |
| JP | 2010-251315 A | 11/2010 | |
| JP | WO2016/121711 A1 | 11/2017 | |
| KR | 10-2000-0068455 A | 11/2000 | |
| WO | 2015/146900 A1 | 10/2015 | |
| WO | WO 2016-121711 | * | 8/2016 |
| WO | WO 2017-054628 | * | 4/2017 |

OTHER PUBLICATIONS

Cheng, Qian et al., "Koh Etched Graphite for Fast Chargeable Lithium-Ion Batteries", Journal of Power Sources, vol. 284, (2015), pp. 258-263.

* cited by examiner

GRAPHITE MATERIAL FOR NEGATIVE ELECTRODE OF LITHIUM ION SECONDARY CELL AND METHOD FOR PRODUCING THE SAME

CROSS-REFERENCE TO RELATED APPLICATIONS

This application claims priority based on Japanese Patent Application No. 2017-176602 filed on Sep. 14, 2017, the entire contents of which are incorporated herein by reference.

BACKGROUND OF THE INVENTION

1. Field of the Invention

The present invention relates to a lithium ion secondary cell, and more specifically to a graphite material to be used as a negative electrode active material in a negative electrode of a lithium ion secondary cell and a method for producing the graphite material.

2. Description of the Related Art

Since lithium ion secondary cells are lighter in weight and higher in energy density than the conventional cells, in recent years, lithium ion secondary cells have been advantageously used as so-called portable power sources for personal computers, portable terminals, and the like and as power sources for driving vehicles. Lithium ion secondary cells are in particular expected to be more and more widespread as a high output power source for driving vehicles such as electric vehicles (EV), hybrid vehicles (HV) and plug-in hybrid vehicles (PHV).

Graphite is a substance that is generally widely used as a negative electrode active material of such lithium ion secondary cells. Graphite is inexpensive and can occlude a relatively large amount of lithium ions. For this reason, the use thereof as a negative electrode active material for lithium ion secondary cells for automotive applications, which are required to have a larger capacity, is expected to expand. Graphite is a laminated structural body in which a plurality of single layers (graphene sheets) composed of hexagonal plate-shaped crystals of carbon are stacked, and reversible intercalation and deintercalation of lithium ions occluded between the layers proceed through edge surfaces (laminated surfaces) having exposed edges where the plurality of layers of graphite overlap. Meanwhile, the basal plane (the plane of the graphene sheet, that is, the benzene condensed surface), which occupies a comparatively large area in a graphite particle, is regarded as a surface that does not normally contribute to intercalation and deintercalation of lithium ions. Therefore, in the graphite material for a negative electrode which is presently used as a negative electrode active material, the intercalation/deintercalation reaction rate of lithium ions from the edge surface is one of the factors limiting the input/output characteristics of a lithium ion secondary cell.

Accordingly, research and development for improving the intercalation/deintercalation reaction rate of lithium ion have been advanced by improving the graphite material. For example, WO 2016/121711 discloses a graphite material with a median diameter D50 adjusted to 5 μm to 35 μm. WO 2016/121711 indicates that the graphite material with a median diameter adjusted to the above range has a faster diffusion of lithium ions and a higher charge/discharge rate.

Further, JP 2010-251315 A discloses a carbon material in which graphitic particles, which have been spheroidized by folding, entanglement, and corner removal and in which, at the same time, fine cracks, fracture, structural defects and the like have been formed on the surface, are covered on the surface with amorphous carbon. It is indicated in JP 2010-251315 A that because of a synergistic effect of high ability of amorphous carbon to accept lithium ions, facilitation of entrance/exit of lithium ions into/from graphite crystals due to formation of fine cracks, fracture, and structural defects on the surface of graphitic particles serving as cores, and good mobility of lithium ions ensured by spheroidized particles, a rapid charge/discharge characteristic is improved.

Furthermore, the abovementioned WO 2016/121711 and JP 2010-251315 A disclose graphite in which the surface including the basal plane is etched with potassium hydroxide (KOH). In these documents, it is indicated that the formation of nano-sized pores on the surface including the basal plane by the etching increases the number of sites where the intercalation/deintercalation reaction of lithium ions is induced. As a result, the intercalation/deintercalation reaction rate of lithium ions can be increased.

SUMMARY

As also indicated in the following two documents:
Journal of Power Sources, 2016, Vol. 324, pp. 475 to 483,
Journal of Power Sources, 2015, Vol. 284, pp. 258 to 263,
where fine pores, cracks, and other structural defects enabling the intercalation/deintercalation of lithium ions (hereinafter various structural defects enabling the intercalation/deintercalation of lithium ions can be also simply referred to as "the defects") are formed on the basal plane of graphite, the number of intercalation/deintercalation paths for lithium ions is increased and the intercalation/deintercalation reaction rate of lithium ions can be increased. This contributes to the objective of improving the rapid input/output characteristic at high rate (high-rate characteristic) of lithium ion secondary cells.

However, in terms of achieving this objective, the conventional graphite material into which the defects are introduced by KOH etching or the like still has room for improvement. In view of the above, it is an object of the present invention to provide a graphite material for a negative electrode of a lithium ion secondary cell, in which the intercalation/deintercalation reaction rate of lithium ions on the basal plane is improved in particular by performing an effective treatment on the basal plane of graphite. Another object is to provide a lithium ion secondary cell including the graphite material as a negative electrode active material.

The inventor of the present invention has found that by supporting a calcium (Ca) component on a graphite particle, in addition to forming the defects enabling the intercalation/deintercalation of lithium ions on the basal plane of the graphite particle, it is possible to improve remarkably the intercalation/deintercalation reaction rate of lithium ions on the basal plane. This finding led to completion of the present invention. That is, in order to achieve the above object, the graphite material disclosed herein and suitable for a negative electrode of a lithium ion secondary cell is characterized by being substantially configured of a graphite particle in which defects enabling intercalation/deintercalation of lithium ions have been formed on a basal plane and which includes a calcium (Ca) component.

By using such a graphite material as a negative electrode active material of a lithium ion secondary cell, it is possible to produce a lithium ion secondary cell excellent in an input/output characteristic. That is, the present invention can provide a lithium ion secondary cell characterized by including the graphite material disclosed herein in the negative electrode.

In one preferred embodiment of the graphite material disclosed herein, the calcium component is characterized by being present in the graphite particles in an amount such that the amount of calcium is 0.5 mg/m$^2$ or more and 15 mg/m$^2$ or less with respect to the specific surface area (1 m$^2$) of the graphite particles. When the amount of the calcium component is within the above range, the intercalation/deintercalation reaction rate of lithium ions on the basal plane can be further improved. Preferably, calcium carbonate is included as the calcium component. The graphite material with the defects supporting calcium carbonate can stably maintain a high intercalation/deintercalation reaction rate of lithium ions on the basal plane.

In addition, the present invention provides a method for suitably producing the graphite material disclosed herein. That is, the method for producing a graphite material to be used for a negative electrode of a lithium ion secondary cell disclosed herein includes:

supplying a calcium-containing substance to a surface of a graphite particle, and supporting a calcium component on the graphite particle by heat treating the graphite particle supplied with the calcium-containing substance on the surface thereof in a temperature range in which defects enabling intercalation/deintercalation of lithium ions can be formed on a basal plane of the graphite particle. With the production method of such a configuration, it is possible to support the calcium component on the graphite particles and also form the defects.

In a preferred embodiment, the production method includes heat treating the graphite particle supplied with the calcium-containing substance on the surface thereof in the abovementioned temperature range in a carbon dioxide gas atmosphere, thereby supporting calcium carbonate as the calcium component on the graphite particle. With such a configuration, a graphite material including calcium carbonate as the calcium component can be suitably produced together with formation of the defects.

DETAILED DESCRIPTION OF THE PREFERRED EMBODIMENTS

Figure 1:
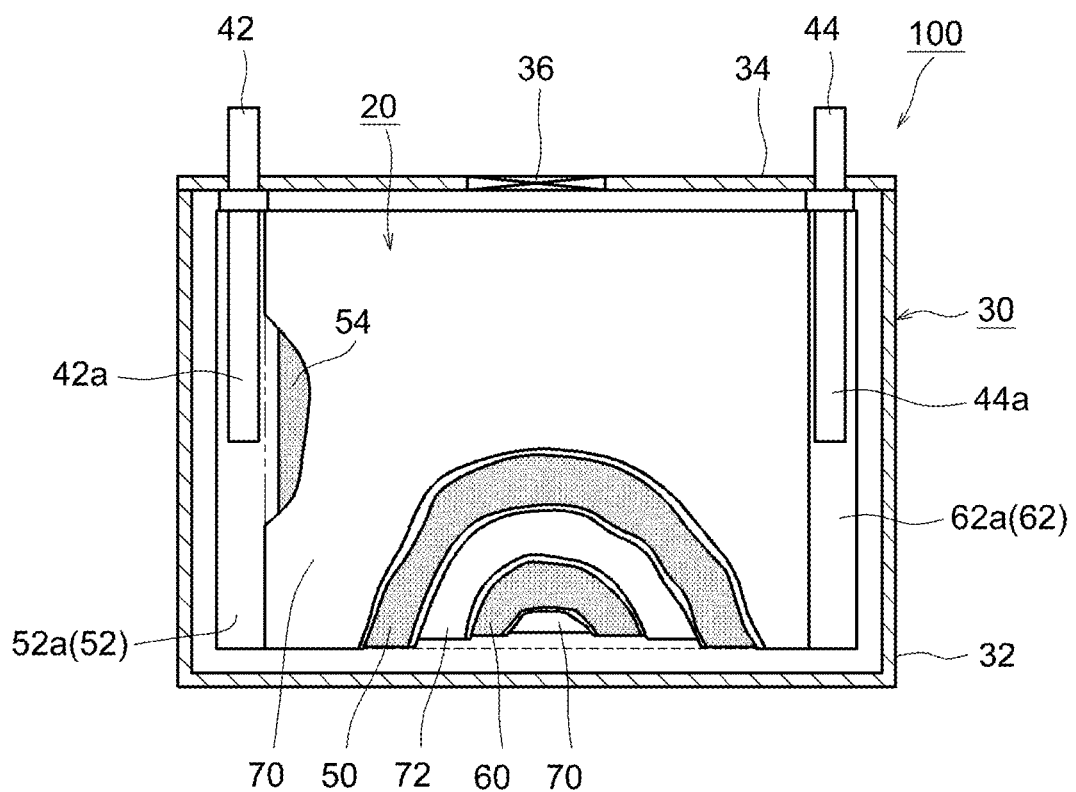
FIG. 1 is a cross-sectional view schematically showing a lithium ion secondary cell according to one embodiment.

An embodiment according to the present invention will be described below with reference to the drawings. In the drawings described below, the same reference numerals will be given to members and portions having the same action, and redundant explanation may be omitted or simplified. Further, the dimensional relationship (length, width, thickness, etc.) in each drawing does not reflect the actual dimensional relationship. In addition, matters other than those specifically mentioned in the present specification and necessary for the implementation of the present invention can be grasped as design matters for a person skilled in the art which are based on the related art in the pertinent field.

In the present specification, the term "lithium ion secondary cell" refers to a secondary cell which uses lithium ions as electrolyte ions and in which charge and discharge are realized by movement of lithium ions between the positive and negative electrodes, and this term is not limited to a specific material (for example, the type of a positive electrode active material or a solvent constituting a nonaqueous electrolytic solution), cell capacity, and form. Further, in the present specification, the term "positive electrode active material" or "negative electrode active material" refers to a material (positive electrode active material or negative electrode active material) that can reversibly occlude and release (typically, intercalate and deintercalate) chemical species (that is, lithium ions) which are to be charge carriers in a lithium ion secondary cell. Therefore, the graphite material disclosed herein is a typical example that can be used as a negative electrode active material. Hereinafter, the present invention will be described in detail by taking a lithium ion secondary cell in which a flat-shaped wound electrode body is housed in an angular cell as an embodiment of the lithium ion secondary cell disclosed herein. It should be noted that the present invention is not intended to be limited to the configuration described in the embodiment.

FIG. 1 is a cross-sectional view of the entire configuration of a lithium ion secondary cell 100 according to the present embodiment. As shown in the drawing, the lithium ion secondary cell 100 includes a flat-shaped wound electrode body 20 and a cell case 30. In addition to the wound electrode body 20, an electrolyte (nonaqueous electrolytic solution) (not shown) is accommodated in the cell case 30. Further, the cell case 30 is configured of a case main body 32 of a box shape (that is, a bottomed rectangular parallelepiped shape) having an opening portion at one end (which corresponds to the upper end portion in a usual usage state of the cell), and a sealing plate (lid body) 34 formed of a rectangular plate member that is attached to the opening portion and closes the opening portion. The material of the cell case 30 is exemplified by aluminum. As shown in FIG. 1, a positive electrode terminal 42 and a negative electrode terminal 44 for external connection are formed on the sealing plate 34. A thin safety valve 36 configured to release the internal pressure of the cell case 30 when the internal pressure rises to a predetermined level or higher is formed between the two terminals 42 and 44 of the sealing plate 34.

Figure 2:
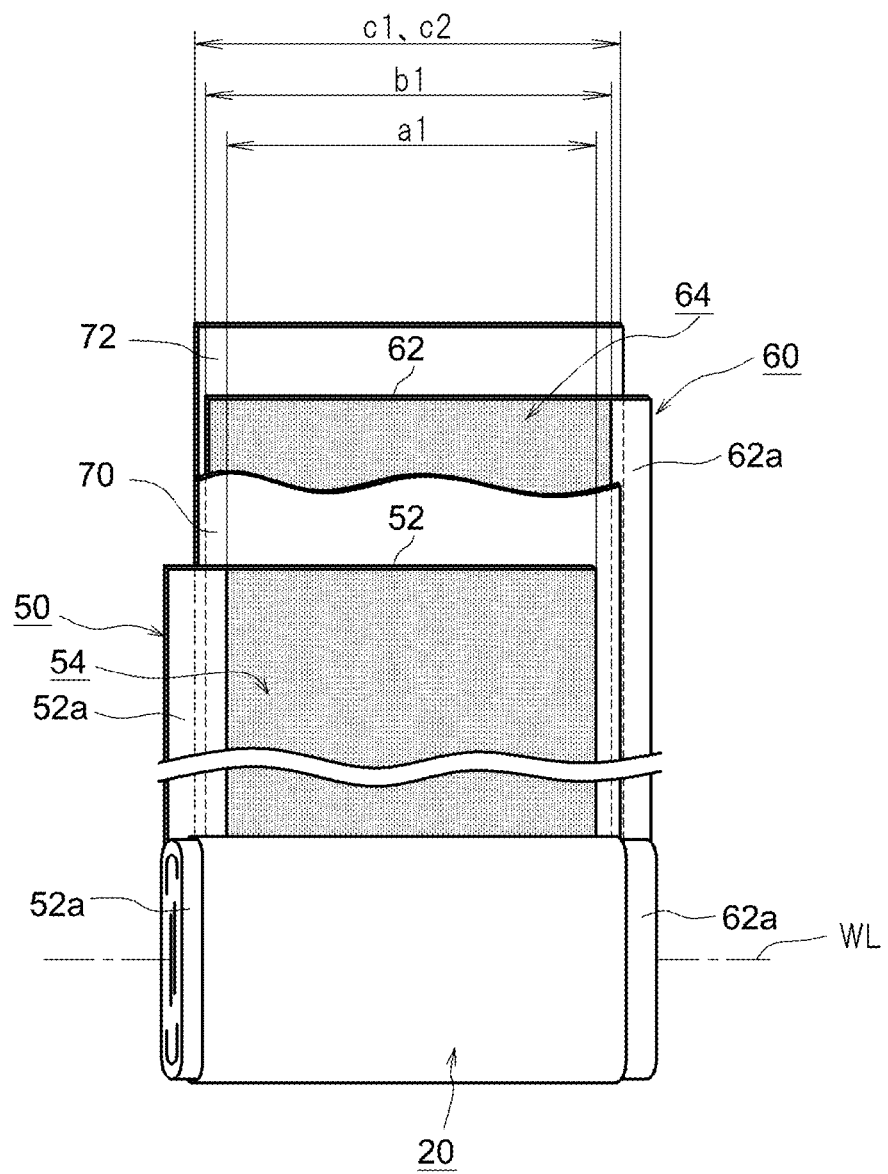
FIG. 2 is a view schematically showing an electrode body (wound electrode body) according to one embodiment.

As shown in FIG. 2, the wound electrode body 20 includes a long sheet-shaped positive electrode (positive electrode sheet 50) and a long sheet-shaped negative electrode (negative electrode sheet 60) similar to the positive electrode sheet 50 and is configured by winding the electrodes in a longitudinal direction in a state in which long sheet-shaped separators 70, 72 are sandwiched between the positive and negative electrodes.

The positive electrode sheet 50 includes a strip-shaped positive electrode current collector 52 and a positive electrode active material layer 54. As the positive electrode current collector 52, for example, a strip-shaped aluminum foil having a thickness of about 15 μm is used. An uncoated portion 52a is set along the edge portion on one side in the width direction of the positive electrode current collector 52. In the illustrated example, the positive electrode active material layer 54 is held on both surfaces of the positive electrode current collector 52 except for the uncoated portion 52a which has been set at the positive electrode current collector 52. The positive electrode active material layer 54 includes a conductive material and a binder in addition to the main positive electrode active material.

A lithium-containing compound (for example, a lithium transition metal composite oxide) including a lithium element and one or two or more transition metal elements, such a material being capable of occluding and releasing lithium ions, can be suitably used as the positive electrode active material. Preferable examples include lithium transition metal oxides having a layered rock salt type or spinel type crystal structure. Such a lithium transition metal oxide is, for example, a lithium nickel composite oxide (for example, $LiNiO_2$), a lithium cobalt composite oxide (for example, $LiCoO_2$), a lithium manganese composite oxide (for example, $LiMn_2O_4$), or a lithium-containing composite oxide of a three-component system such as a lithium nickel cobalt manganese composite oxide (for example, $LiNi_{1/3}Co_{1/3}Mn_{1/3}O_2$). In addition, polyanionic compounds (for example, $LiFePO_4$, $LiMnPO_4$, $LiFeVO_4$, $LiMnVO_4$, $Li_2FeSiO_4$, $Li_2MnSiO_4$, and $Li_2CoSiO_4$) represented by a general formula $LiMPO_4$, $LiMVO_4$, or $Li_2MSiO_4$ (M in the formulas is at least one or more elements selected from Co, Ni, Mn, and Fe) may be used as the positive electrode active material.

The conductive material may be any material that could be used in the conventional lithium ion secondary cell, and examples thereof include a carbon material such as carbon powder and carbon fiber. As the carbon powder, various carbon powders such as carbon black (for example, acetylene black, furnace black, Ketjen black) and graphite powder can be used. The carbon powder is preferably acetylene black (AB). Such conductive materials can be used singly or in appropriate combination of two or more thereof.

As the binder, a binder such as have been used for the positive electrode of a general lithium ion secondary cell can be appropriately used. For example, when the positive electrode active material layer 54 is formed by supplying paste, a polymer capable of being uniformly dissolved or dispersed in the solvent constituting the paste can be used as the binder. When a nonaqueous paste is used, a polymer material soluble in an organic solvent such as a halogenated vinyl resin, such as polyvinylidene fluoride (PVDF) or polyvinylidene chloride (PVDC), or a polyalkylene oxide such as polyethylene oxide (PEO) or the like can be used. When an aqueous paste is used, a water-soluble polymer material or a water-dispersible polymer material can be advantageously used. Examples thereof include polytetrafluoroethylene (PTFE), carboxymethyl cellulose (CMC), styrene butadiene rubber (SBR), and the like.

For example, the positive electrode sheet 50 can be formed by dispersing the above-described positive electrode active material, conductive material, and binder in an appropriate dispersion medium to prepare a positive electrode paste (the "paste" is inclusive of forms called slurry, ink, and the like; same hereinbelow) supplying the prepared paste to the surface of the positive electrode current collector 52 excluding the uncoated portion 52a, drying, and pressing to a predetermined thickness. As a medium for dispersing the materials constituting the positive electrode active material layer 54, any of aqueous solvents and nonaqueous solvents (organic solvents) can be used as long as the solvent conforms to the properties of the binder to be used. For example, as an aqueous solvent, water or a mixed solvent including water as the main component can be used. As a solvent other than water constituting such a mixed solvent, one or two or more kinds of organic solvents (for example, lower alcohols and lower ketones) which can be uniformly mixed with water can be appropriately selected and used. As the nonaqueous solvent, for example, N-methyl-2-pyrrolidone (NMP) can be suitably used.

Meanwhile, as shown in FIG. 2, the negative electrode sheet 60 includes a strip-shaped negative electrode current collector 62 and a negative electrode active material layer 64. For the negative electrode current collector 62, for example, a strip-shaped copper foil having a thickness of about 10 μm is used. On one side in the width direction of the negative electrode current collector 62, an uncoated portion 62a is set along the edge portion. The negative electrode active material layer 64 is held on both sides of the negative electrode current collector 62 except for the uncoated portion 62a set at the negative electrode current collector 62. The negative electrode active material layer 64 includes a binder in addition to the main negative electrode active material. Among the abovementioned materials, the graphite material disclosed herein is used as the negative electrode active material which is the main component of the negative electrode active material layer 64. Properties and production examples of the graphite material will be described hereinbelow.

As the binder, a binder such as that used for the negative electrode of a general lithium ion secondary cell can be appropriately used. For example, the same binder as in the positive electrode sheet 50 can be used. In a preferred embodiment, when an aqueous solvent is used to form the negative electrode active material layer 64, a rubber such as SBR or the like; a water-soluble polymer material copolymer or a water-dispersible polymer material such as PEO, a vinyl acetate copolymer, or the like can be used. SBR is more preferably used.

Depending on the method of forming the negative electrode active material layer 64, a thickener may be included. As such a thickener, the same binder as the above-mentioned binder may be used, and for example, the following water-soluble or water-dispersible polymer may be used. Examples of the water-soluble polymer include cellulosic polymers such as methyl cellulose (MC), carboxymethyl cellulose (CMC), cellulose acetate phthalate (CAP), hydroxypropyl methyl cellulose (HPMC), and the like; polyvinyl alcohol (PVA) and the like. For example, the negative electrode sheet 60 can be formed by dispersing the above-described negative electrode active material (graphite material), a binder, and a thickener in an appropriate dispersion medium to prepare a negative electrode paste, supplying the prepared paste to the surface of the negative electrode current collector 62 excluding the uncoated portion 62a, drying, and pressing to a predetermined thickness. An aqueous solvent (preferably water) can be used as a medium for dispersing the material constituting the negative electrode active material layer 64.

The separators 70, 72 are members for separating the positive electrode sheet 50 and the negative electrode sheet 60 from each other. The separators 70, 72 are configured to allow lithium ions to pass therethrough and to have a function of holding the nonaqueous electrolyte and a shutdown function. As the separators 70 and 72, porous membranes or nonwoven fabrics made of resin such as polyethylene (PE), polypropylene (PP), polyesters, cellulose, polyamides or the like can be used. Among them, a porous membrane made of a polyolefin resin such as PE or PP is preferable. The separators 70, 72 may have a single-layer structure composed of a single porous membrane or nonwoven fabric, or may have a structure in which two or more porous membranes or nonwoven fabrics having different materials or properties (for example, average thickness and porosity) are laminated (for example, a three-layer structure in which PP layers are laminated on both surfaces of the PE layer). A heat-resistant layer (HRL) may be provided on the surface facing the negative electrode side of the separators 70 and 72.

As shown in FIG. 2, the wound electrode body 20 is prepared by laminating the positive electrode sheet 50 and the negative electrode sheet 60, with the separators 70, 72 being interposed between the positive electrode active material layer 54 and the negative electrode active material layer 64, winding the laminate in the longitudinal direction, and then pressing the obtained wound body from the lateral direction to flatten the wound body in a flat shape. In the present embodiment, as shown in FIG. 2, the width b1 of the negative electrode active material layer 64 is slightly larger than the width a1 of the positive electrode active material layer 54. Further, the widths c1, c2 of the separators 70, 72 are slightly larger than the width b1 of the negative electrode active material layer 64 (c1, c2>b1>a1).

In the wound electrode body 80, the uncoated portion 52$a$ of the positive electrode sheet 50 and the uncoated portion 62$a$ of the negative electrode sheet 60 protrude on opposite sides in the width direction of the separators 70, 72 (that is, in the direction of a winding axis WL). Among them, a positive electrode current collecting terminal 42$a$ is attached to the uncoated portion 52$a$ of the positive electrode sheet 50, and is connected to the positive electrode terminal 42. The positive electrode current collecting terminal 42$a$ is made of, for example, aluminum or an aluminum alloy. In this example, as shown in FIG. 2, the positive electrode current collecting terminal 42$a$ extends to the central portion of the uncoated portion 52$a$ of the positive electrode sheet 50 of the wound electrode body 80. The tip portion of the positive electrode current collecting terminal 42$a$ is welded (for example, ultrasonically welded) to a substantially central portion of the uncoated portion 52$a$. Likewise, a negative electrode current collecting terminal 44$a$ is attached to the uncoated portion 62$a$ of the negative electrode sheet 60, and is connected to the negative electrode terminal 44. The negative electrode current collecting terminal 44$a$ is made of, for example, copper or a copper alloy. The negative electrode current collecting terminal 44$a$ extends to the central portion of the uncoated portion 62$a$ of the negative electrode sheet 60 of the wound electrode body 80. The tip portion of the negative electrode current collecting terminal 44$a$ is welded (for example, resistance welded) to the central portion of the uncoated portion 62$a$.

The same nonaqueous electrolytic solution as has been conventionally used for a lithium ion secondary cell can be used, without particular limitation, as the nonaqueous electrolytic solution. Such a nonaqueous electrolytic solution typically has a composition in which a supporting salt is contained in a suitable nonaqueous solvent. As the nonaqueous solvent, for example, ethylene carbonate (EC), propylene carbonate (PC), dimethyl carbonate (DMC), diethyl carbonate (DEC), ethyl methyl carbonate (EMC), or the like can be used. As the supporting salt, for example, lithium salts such as $LiPF_6$, $LiBF_4$, $LiN(SO_2CF_3)_2$, $LiN(SO_2C_2F_5)_2$, $LiCF_3SO_3$, $LiC_4F_9SO_3$, $LiC(SO_2CF_3)_3$, $LiClO_4$ or the like can be used. Further, the nonaqueous electrolytic solution may further include additives such as a film forming agent, an overcharge additive, a surfactant, a dispersant, and a thickener for the purpose of further improving the characteristics of the lithium ion secondary cell 100.

Next, the graphite material disclosed herein will be described in detail. As schematically shown on the right side of FIG. 3, a graphite particle 10, which constitutes the main body of the graphite material disclosed herein, is a graphite particle 10 characterized by formation of defects 14 enabling the intercalation/deintercalation of lithium ions on a basal plane 12 and by including a calcium (Ca) component 16 (hereinafter also referred to as "(defect+Ca)-containing graphite particle"). That is, the (defect+Ca)-containing graphite particle 10 disclosed herein is a graphite material that can be produced by using various graphite particles 1 (left side in FIG. 3) commonly used as a negative electrode active material of a lithium ion secondary cell as raw material graphite, and heat treating the raw graphite material as described below in the presence of a calcium-containing substance such as a calcium salt.

The raw material graphite particle 1 is not particularly limited and various graphite materials such as an ordinary natural graphite particle, artificial graphite, or pyrolytic graphite (typically, graphite obtained by treating coke at a high temperature such as 2500° C. or higher) can be used. Further, a particle obtained by spheroidizing various graphite materials by general processing process (grinding process, spherical molding process or the like) may be used, for example, scaly graphite may be used. The size of the graphite particle may be such as that of particles generally used as a negative electrode active material of a lithium ion secondary cell. For example, in the case of spheroidized graphite, the average particle diameter is preferably about 1 µm to 30 µm (typically 5 µm to 20 µm), as represented by a median diameter (average particle diameter D50: 50% volume average particle diameter) that can be derived from the particle size distribution measured by a particle size distribution measuring apparatus based on a laser scattering/diffraction method.

Figure 3:
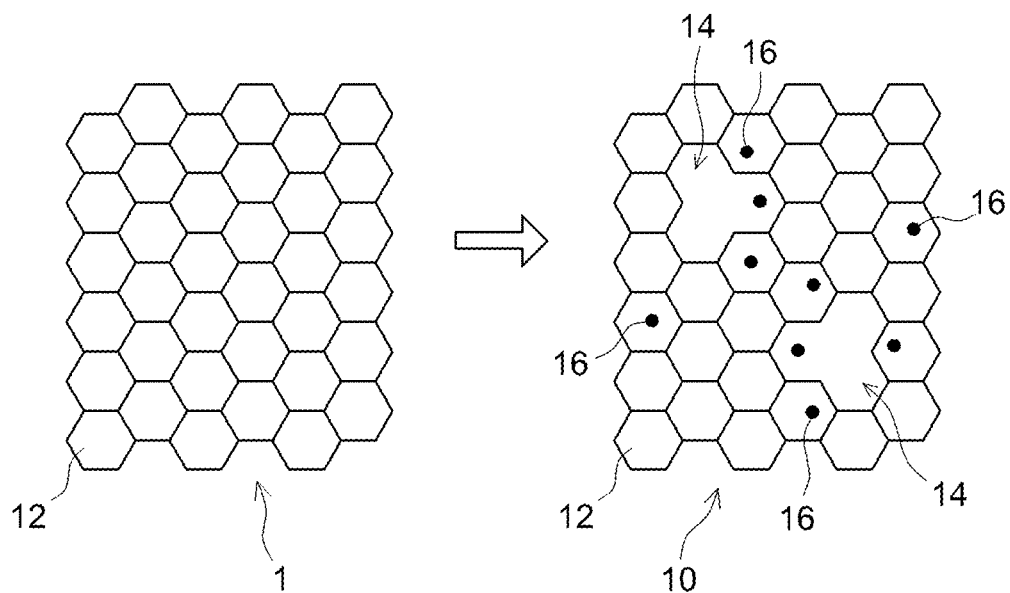
FIG. 3 is an explanatory view schematically showing a basal plane of a graphite particle disclosed herein.

As schematically shown on the right side of FIG. 3, in the (defect+Ca)-containing graphite particle 10 substantially constituting the graphite material disclosed herein (for example, 70% by mass or more, preferably 80% by mass or more, particularly preferably 90% by mass to 100% by mass of the entire graphite material is composed of the (defect+Ca)-containing graphite particle 10), in addition to the fact that the defects 14 enabling the intercalation/deintercalation of lithium ions are formed on the basal plane 12, the calcium component 16 is typically included in the basal plane 12 and the defects 14, thereby enabling favorable intercalation/deintercalation of lithium ions between the layers also from the basal plane in addition to that from the edge surface. Therefore, the intercalation/deintercalation reaction rate of lithium ions can be remarkably improved.

The graphite material disclosed herein can be produced in the following manner. First, a calcium-containing substance is supplied to the surface of the raw material graphite particle such as described above. Here, the calcium-containing substance may be any substance that can be supported on a graphite particle as a calcium salt by the heat treatment described hereinbelow. Calcium salts such as various calcium inorganic salts, organic salts and the like are typical examples included in the concept of calcium-containing substance. For example, inorganic salts can be exemplified by calcium chloride, calcium nitrate, calcium silicate, calcium phosphate and the like. Organic salts are exemplified by various organic acid salts such as calcium citrate, calcium acetate, calcium stearate and the like. The calcium-containing substance to be used is not limited to one type, and a plurality of types may be used at the same time. Further, a compound for forming a salt with calcium may be supported on the surface of the graphite particle in advance. Furthermore, the calcium-containing substance to be used is not limited to a form in which the calcium-containing substance is supplied to the graphite particles as a solution or powder (solid matter) including the substance, and the calcium-containing substance (inclusive of Ca alone) may be directly deposited on the surface of the graphite particle by physical or chemical means (for example, CVD).

In a typical method, raw material graphite particles are dispersed in a reaction solution including a desired calcium-containing substance in an appropriate solvent (for example, water). With such a method, the calcium-containing substance or a new calcium salt derived from the calcium-containing substance can be supplied and adhered to the surface of the graphite particles in the dispersion. Incidentally, by mixing an appropriate dispersant (surfactant, and the like) into the reaction solution, it is possible to realize good dispersion of raw material graphite particles.

Next, the graphite particles supplied with the calcium-containing substance on the surface thereof by the above-described method are heat-treated in a temperature range where defects enabling the intercalation/deintercalation of lithium ions can be formed on the basal plane of the graphite particles. Such a temperature range is not limited as long as the calcium-containing substance and the basal plane can react with each other to generate the defects, but the heat treatment is preferably performed in a temperature range of 800° C. or more, for example, about 900° C. to 1000° C. As a result, satisfactory defects can be formed on the basal plane by causing the reaction of the calcium component with the graphite particle basal plane while supporting the calcium component on the graphite particle.

In a preferred embodiment, the heat treatment of the graphite particle supplied with the calcium-containing substance on the surface thereof is performed in a carbon dioxide gas atmosphere. By performing the heat treatment in such an atmosphere, calcium carbonate can be easily supported as a calcium component on the graphite particles. Since calcium carbonate (typically $CaCO_3$) can burn carbon atoms constituting graphite by thermal reaction with graphite ($C+CaCO_3 \rightarrow CaO+2CO$), calcium carbonate is a calcium component suitable for the purpose of forming defects on the basal plane of graphite.

The amount of the calcium component to be supported on the graphite particle is not particularly limited and can be set in various ranges as long as the object of the present invention can be achieved. For example, it is appropriate to support the calcium component on the graphite particle in an amount such that the amount of Ca is 0.1 $mg/m^2$ or more and 50 $mg/m^2$ or less with respect to the specific surface area of the graphite particle, and it is preferable to support the calcium component on the graphite particle in an amount such that the amount of Ca is 0.2 $mg/m^2$ or more and 20 $mg/m^2$ or less, particularly preferably 0.5 $mg/m^2$ or more and 15 $mg/m^2$. It is undesirable that the amount of calcium component (in other words, the amount of Ca) be too small, because no increase in the intercalation/deintercalation reaction rate of lithium ions on the basal plane can be recognized. It is also undesirable that the amount of calcium component (Ca amount) be too large because the intercalation/deintercalation reaction of lithium ions on the basal plane can be impeded.

The amount of the calcium component to be supported on the graphite particle can be adjusted by washing the graphite particle with an appropriate acidic agent (for example, hydrochloric acid, nitric acid or another inorganic acid) and removing the excessive calcium component after the heat treatment. In other words, the amount of supported calcium component can be adjusted by treating the graphite particle which has been caused to support a somewhat excessive calcium component in advance with an acidic agent such as hydrochloric acid having an appropriate concentration of about 1 M to 3 M.

Hereinafter, some test examples relating to the present invention will be described, but the present invention is not intended to be limited to matters shown in such test examples.

Test Example 1: Production of Graphite Material

A total of eight types of graphite materials of Samples 1 to 8 were produced by the process described below.
<Sample 1>
Commercially available general spheroidized graphite was used as raw material graphite particles and subjected to the following treatment to produce a graphite material of Sample 1. That is, a graphite dispersion was prepared by adding 50 g of spheroidized graphite to a solution prepared by dissolving 1 g of sodium stearate in 300 mL of ion exchanged water, and then stirring for about 1 h. In such a dispersion, since sodium stearate acted as a surfactant, precipitation and aggregation of graphite particles were prevented and a satisfactory dispersion state was maintained. Next, about 30 mL of a 0.33 M calcium chloride solution was added to this graphite dispersion. Thereafter, stirring was continued for about 1 h, and the powder composed of graphite particles was recovered by filtration. The obtained graphite powder was washed with ion exchanged water and vacuum dried at 120° C. for 6 h. Next, the graphite powder was heat-treated at 900° C. for 2 h in a carbon dioxide gas atmosphere. Thereafter, the graphite powder was washed at room temperature in 2 M hydrochloric acid to remove excessive calcium component present on the graphite particle surface. After washing with hydrochloric acid, vacuum drying was performed at 120° C. for 6 h to obtain a graphite material of Sample 1.
<Sample 2>
A graphite material of Sample 2 was produced by the same process as the production process of the graphite material of Sample 1 except that the hydrochloric acid washing treatment was carried out at 60° C.
<Sample 3>
A graphite material of Sample 3 was produced by the same process as the production process of the graphite material of Sample 1 except that the hydrochloric acid washing treatment was not carried out.
<Sample 4>
The production process of the graphite material of Sample 1 was not carried out at all and the raw material graphite particles (spheroidized graphite) were used as the graphite material of Sample 4.
<Sample 5>
A graphite material of Sample 5 was produced by the same process as the production process of the graphite material of Sample 1 except that the heat treatment in the carbon dioxide gas atmosphere was performed at 600° C.
<Sample 6>
A graphite material of Sample 6 was produced by the same process as the production process of the graphite material of Sample 1 except that the calcium chloride solution was not added to the graphite dispersion (that is, the calcium-containing substance was not used).

11

<Sample 7>

A graphite material of Sample 7 was produced by the same process as the production process of the graphite material of Sample 1 except that the calcium chloride solution was not added to the graphite dispersion (that is, the calcium-containing substance was not used) and the heat treatment in the carbon dioxide gas atmosphere was performed at 1000° C.

<Sample 8>

A graphite material of Sample 8 was produced by the same process as the production process of the graphite material of Sample 1 except that the following changes (1)-(3) were made.

(1) The calcium-containing substance to be added to the graphite dispersion was changed from 30 mL of the 0.33 M calcium chloride solution to 1.5 g of calcium acetate.

(2) After the addition of calcium acetate, stirring was continued for about 1 h and then water was removed with an evaporator.

(3) After the heat treatment at 900° C. for 2 h in the carbon dioxide gas atmosphere, the hydrochloric acid washing treatment was not carried out.

Test Example 2: Observation of Surface of Graphite Particles

Figure 4:
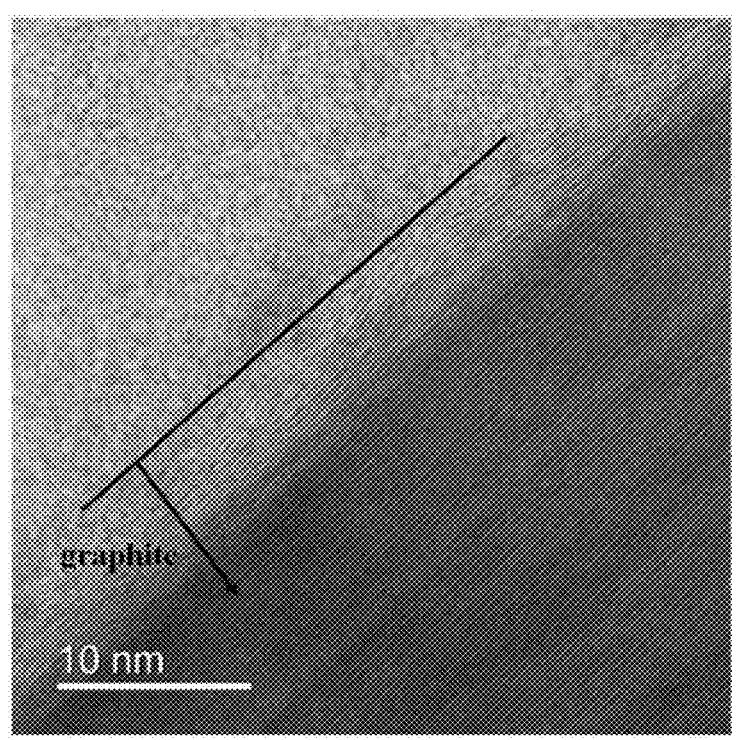
FIG. 4 is a TEM image showing a basal plane (having a defect) of a graphite particle according to an example (Sample 1)
Figure 5:
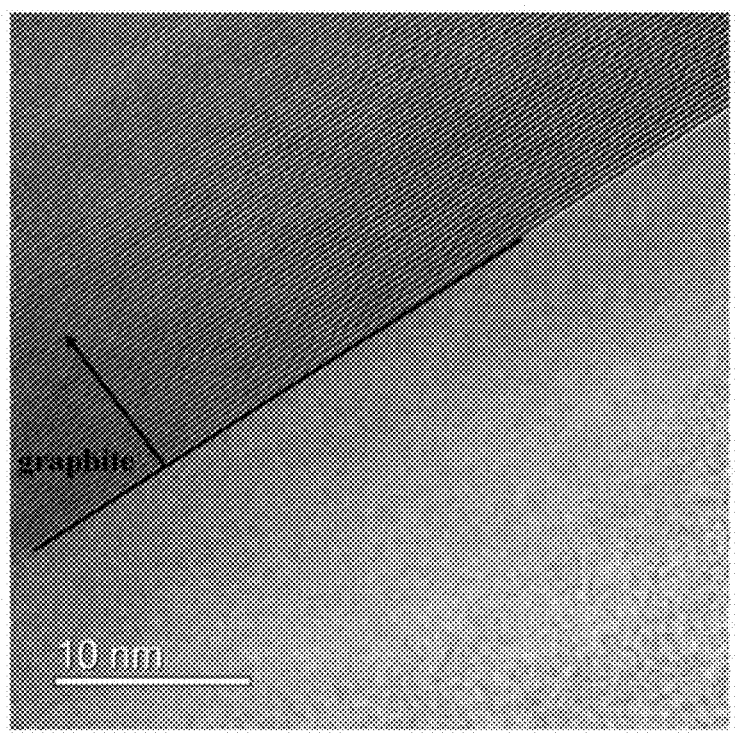
FIG. 5 is a TEM image showing a basal plane (no defects) of a graphite particle according to one comparative example (Sample 4).

The graphite material (graphite particles) of each of the above prepared samples was observed with a transmission electron microscope (TEM), and the presence or absence of defect formation on the basal plane was confirmed. That is, after fixing the graphite particles of each sample with a resin, a sample for electron microscopic observation was prepared by Ar ion milling method. Next, TEM observation was performed based on the manual of the apparatus to be used, and the presence or absence of defects on the basal plane on the surface of the graphite particle of each sample was investigated. As a representative result, FIG. 4 shows a TEM image of the basal plane of the graphite particle of Sample 1, and FIG. 5 shows a TEM image of the basal plane of the graphite particle of Sample 4. As is apparent from the two TEM images in FIG. 4 and FIG. 5, the structure of the basal plane of the graphite particle of Sample 1 was significantly disturbed as compared to the basal plane of the graphite particle of Sample 4, and it was confirmed that the defects were formed (introduced). Although detailed TEM images of Samples 2, 3, 7 and 8 are not shown in the drawings, the formation of defects on the basal plane similar to that in Sample 1 was also recognized for these samples. Meanwhile, in Samples 5 and 6, as with Sample 4, no defects were found on the basal plane. These results are shown in the corresponding column of Table 1.

12

Test Example 3: Calculation of Calcium Amount/Specific Surface Area

The graphite material (graphite particles) of each sample was added to concentrated sulfuric acid, stirred, and then filtered. Then, the amount of calcium in the filtrate was quantitatively analyzed by ICP emission spectrometry using high-frequency inductively coupled plasma (ICP) as a light source. Next, the specific surface area of the graphite material of each sample was measured by measuring adsorption of krypton gas to each graphite sample by using a gas adsorption apparatus (BELSORP-max, manufactured by MicrotracBEL Corp.). Specifically, the krypton adsorption amount was measured while the relative pressure of krypton with respect to the atmospheric pressure was 0 to 1, and the specific surface area was calculated by the BET method. Calcium amount (mg/m$^2$) relative to the specific surface area (1 m$^2$) of the graphite material of each sample was calculated from the amount of calcium and the specific surface area obtained as described above. The results are shown in the corresponding column of Table 1.

Test Example 4: Preparation of Negative Electrode and Construction of Negative Electrode/Metallic Lithium Test Cell for Evaluation The graphite material, binder (SBR) and thickener (CMC) of each sample were weighed to obtain the weight ratio of 98:1:1, and were dispersed in water to prepare a negative electrode paste. The negative electrode paste was applied onto a copper foil, dried in vacuum, and rolled by a roll press machine to produce a total of eight negative electrode sheets corresponding to the graphite material of each sample. Next, a test cell was constructed by arranging the negative electrode prepared by punching each negative electrode sheet into a 2 cm$^2$ disk and a counter electrode made of metallic lithium opposite to each other with a polyethylene separator interposed therebetween. A nonaqueous electrolytic solution prepared by dissolving 1 M of LiPF$_6$ in a nonaqueous solvent prepared by mixing EC, DMC, and EMC at a volume ratio of 3:4:3 was used as the electrolytic solution. Initial charging was performed at a current density of 0.05 mA/cm$^2$ until the difference in potential with the counter electrode reached 0.005 V, and discharging was performed at the same current density until the difference in potential with the counter electrode reached 1.5 V.

Each cell constructed correspondingly to the graphite materials of Samples 1 to 8 was subjected to constant-current/constant-voltage charging until the potential difference reached 0.005 V, and then the cells were disassembled in the glove box and the negative electrode that was potential-adjusted in the same manner was used as a facing electrode to prepare a symmetric cell. The prepared symmetric cell was used as a sample, and the impedance was measured at −30° C. by using a frequency response analyzer manufactured by Solartron Co. The reaction resistance of the negative electrode corresponding to each sample was examined by arc fitting from the obtained impedance spectrum. The results are shown as relative values when the reaction resistance value of the negative electrode corresponding to Sample 4 is taken as 100 in the corresponding column of Table 1. By conducting the impedance measurement of such a symmetric cell, it is possible to accurately evaluate only the reaction resistance of the negative electrode to be measured, without performing resistance separation which

TABLE 1

| Sample No. | Basal plane defects | Specific surface area (m$^2$/g) | Ca amount/ specific surface area (mg/m$^2$) | Relative value of positive electrode reaction resistance at −30° C. (Sample 4 = 100) |
|---|---|---|---|---|
| 1 | Present | 13.5 | 2.2 | 50 |
| 2 | Present | 12.7 | 0.5 | 57 |
| 3 | Present | 15.5 | 15 | 60 |
| 4 | Absent | 12.5 | 0 | 100 |
| 5 | Absent | 11.7 | 2.5 | 112 |
| 6 | Absent | 12.3 | 0 | 101 |
| 7 | Present | 15.2 | 0 | 96 |
| 8 | Present | 18.4 | 104 | 198 | becomes a problem in a negative electrode-metal lithium counter electrode cell or a negative electrode-positive electrode cell.

—Test Results—

As clearly follows from the items described in Table 1, a significant reduction in the negative electrode reaction resistance at −30° C. was confirmed for the test cells constructed using as a negative electrode active material the graphite material of Samples 1 to 3 which had defects on the basal plane and in which the amount of calcium per specific surface area of 1 $m^2$ of the graphite particles was 0.5 mg or more and 15 mg or less. This result indicates that the intercalation/deintercalation of lithium ions from the defects formed on the basal plane is performed satisfactorily due to the presence of the calcium component. Meanwhile, in the test cells constructed using the graphite materials of Samples 5 and 6 having no defects on the basal plane as the negative electrode active material, since the intercalation/deintercalation of lithium ions from the basal plane was not performed, the negative electrode reaction resistance at −30° C. did not decrease regardless of the presence or absence of the calcium component. Further, in the test cell constructed using the graphite material of Sample 7 having the defects on the basal plane as the negative electrode active material, since the calcium component was not present, the rate of decrease in negative electrode reaction resistance at −30° C. was not large. Furthermore, in the test cell constructed using the graphite material of Sample 8 having the defects on the basal plane as the negative electrode active material, since the calcium component was present in an excessively large amount, the intercalation/deintercalation of lithium ions from the basal plane was inhibited, and the negative electrode reaction resistance at −30° C. conversely increased. From this, it can be found that the amount of calcium per specific surface area of 1 $m^2$ of the graphite particles is preferably about 50 mg or less.

Although specific examples of the present invention have been described in detail above, these are merely examples and place no limitation on the scope of claims. The technique described in the claims is inclusive of various modifications and changes of the specific examples exemplified above. The graphite material disclosed herein consists essentially of the (defect+Ca)-containing graphite particles 10 (FIG. 3) and is, therefore, suitable as a negative electrode active material for a lithium ion secondary cell as a driving power source to be mounted on a vehicle, such as an electric vehicle (EV), a hybrid vehicle (HV), or a plug-in hybrid vehicle (PHV), which is particularly required to have high high-rate input/output characteristic.

What is claimed is:

1. A graphite material for a negative electrode of a lithium ion secondary cell, the graphite material being substantially configured of a graphite particle in which defects enabling intercalation/deintercalation of lithium ions have been formed on a basal plane,
   wherein the graphite particle comprises a calcium (Ca) component in the basal plane, and
   calcium carbonate is included as the calcium component.

2. The graphite material for a negative electrode of a lithium ion secondary cell according to claim 1, wherein the calcium component is present in the graphite particle in an amount such that the amount of calcium is 0.5 mg/$m^2$ or more and 15 mg/$m^2$ or less with respect to a specific surface area of the graphite particle.

3. A lithium ion secondary cell comprising a negative electrode and a positive electrode, the negative electrode comprising a graphite material being substantially configured of a graphite particle in which defects enabling intercalation/deintercalation of lithium ions have been formed on a basal plane,
   wherein the graphite particle comprises a calcium (Ca) component in the basal plane, and
   calcium carbonate is included as the calcium component.

4. The lithium ion secondary cell according to claim 3, wherein the calcium component is present in the graphite particle in an amount such that the amount of calcium is 0.5 mg/$m^2$ or more and 15 mg/$m^2$ or less with respect to a specific surface area of the graphite particle.

5. A method for producing a graphite material for a negative electrode of a lithium ion secondary cell, the method comprising:
   supplying a calcium-containing substance to a surface of a graphite particle; and
   supporting a calcium component in a basal plane of the graphite particle by heat treating the graphite particle supplied with the calcium-containing substance on the surface thereof in a temperature range in which the calcium-containing substance and the basal plane can react with each other to generate defects enabling intercalation/deintercalation of lithium ions on the basal plane of the graphite particle.

6. The production method according to claim 5, including supporting calcium carbonate as the calcium component in the basal plane of the graphite particle by heat-treating the graphite particle supplied with the calcium-containing substance on the surface thereof in the temperature range in a carbon dioxide gas atmosphere.

7. The production method according to claim 6, wherein the temperature range is about 800° C. to 1000° C.

8. The production method according to claim 5, wherein the temperature range is about 800° C. to 1000° C.

* * * * *